(12) United States Patent
Stadtfeld (10) Patent No.: US 9,132,493 B2
(45) Date of Patent: Sep. 15, 2015

(54) CONTINUOUS METHOD FOR MANUFACTURING FACE GEARS

(75) Inventor: Hermann J. Stadtfeld, Webster, NY (US)

(73) Assignee: THE GLEASON WORKS, Rochester, NY (US)

( * ) Notice: Subject to any disclaimer, the term of this patent is extended or adjusted under 35 U.S.C. 154(b) by 562 days.

(21) Appl. No.: 13/521,064

(22) PCT Filed: Jan. 28, 2011

(86) PCT No.: PCT/US2011/022858
§ 371 (c)(1),
(2), (4) Date: Jul. 9, 2012

(87) PCT Pub. No.: WO2011/094492
PCT Pub. Date: Aug. 4, 2011

(65) Prior Publication Data
US 2012/0328383 A1  Dec. 27, 2012

Related U.S. Application Data (60) Provisional application No. 61/299,386, filed on Jan. 29, 2010.

(51) Int. Cl.
*B23F 1/06* (2006.01)
*B23F 1/02* (2006.01)
(Continued)

(52) U.S. Cl.
CPC . *B23F 15/06* (2013.01); *B23F 1/02* (2013.01); *B23F 1/06* (2013.01); *B23F 5/06* (2013.01); *Y10T 409/104293* (2015.01); *Y10T 409/105883* (2015.01)

(58) Field of Classification Search
CPC .............. B23F 1/06; B23F 1/02; B23F 5/06; B23F 5/065; B23F 5/08; B23F 5/085; B23F 5/202
USPC .......... 409/12, 17, 26, 28, 38, 39, 51; 451/47, 451/253
See application file for complete search history.

(56) References Cited

U.S. PATENT DOCUMENTS 1,349,951 A * 8/1920 Gleason et al. ................ 409/26
1,365,433 A * 1/1921 Wingqvist ..................... 409/39
(Continued)

FOREIGN PATENT DOCUMENTS

| CH | 96209 A * | 9/1922 | ............... B23F 5/06 |
| CH | 250712 A * | 9/1947 | ............... B23F 5/06 |

(Continued)

OTHER PUBLICATIONS

Basstein et al., "New Developments in Design, Manufacturing and Applications of CYLKRO—(FACE) Gears", AGMA Technical Paper, Oct. 1, 1993, 12 pages, XP-008002398.

*Primary Examiner* — Sunil K Singh
*Assistant Examiner* — Ryan Rufo
(74) *Attorney, Agent, or Firm* — Robert L. McDowell (57) ABSTRACT

A continuous method of manufacturing a face gear utilizing a tool, representing a plane which can be oriented to a face gear workpiece under an angle equal to the pressure angle of the mating pinion member of the gear set (e.g. the face gear set), and, which can be rotated around a virtual pinion axis to generate a tooth flank on the workpiece. The tool is a face cutter which performs a continuous indexing motion with equal hand of rotation of cutter and workpiece (e.g. face gear) thereby describing a hypocycloid path of motion and an indexing ratio of two cutter rotations during one workpiece gear rotation which will produce straight lines along the face width of the face gear.

12 Claims, 9 Drawing Sheets

(51) Int. Cl.
*B23F 15/06* (2006.01)
*B23F 5/06* (2006.01)

(56) References Cited

U.S. PATENT DOCUMENTS

| | | | | |
|---|---|---|---|---|
| 1,385,097 | A | * | 7/1921 | Schmick .................... 409/10 |
| 1,403,113 | A | * | 1/1922 | Geffroy et al. .............. 409/25 |
| 1,474,500 | A | * | 11/1923 | Wingqvist .................. 409/40 |
| 1,609,331 | A | * | 12/1926 | Trbojevich .................. 409/12 |
| 1,622,555 | A | * | 3/1927 | Wildhaber ................... 409/26 |
| 1,655,080 | A | * | 1/1928 | Wildhaber ................... 409/26 |
| 1,673,540 | A | * | 6/1928 | Wildhaber ................... 409/26 |
| 1,676,419 | A | * | 7/1928 | Wildhaber ................... 409/26 |
| 1,705,887 | A | * | 3/1929 | Wildhaber ................... 409/26 |
| 1,863,571 | A | * | 6/1932 | Lees ........................ 451/47 |
| 1,934,754 | A | * | 11/1933 | Wildhaber ................... 451/47 |
| 2,100,705 | A | * | 11/1937 | Wildhaber et al. ............ 451/47 |
| 2,372,240 | A | * | 3/1945 | Wildhaber ................... 409/26 |
| 3,060,642 | A | * | 10/1962 | Cleff ....................... 451/120 |
| 3,099,939 | A | * | 8/1963 | Haase et al. ................ 409/25 |
| 3,137,206 | A | * | 6/1964 | Shinjo ...................... 409/30 |
| 3,184,988 | A | * | 5/1965 | Osplack et al. .............. 74/457 |
| 4,339,895 | A | * | 7/1982 | Fivian ...................... 451/47 |
| 4,954,027 | A | * | 9/1990 | Faulstich ................... 409/26 |
| 4,954,028 | A | * | 9/1990 | Seroo et al. ................ 409/26 |
| 4,982,532 | A | * | 1/1991 | Hosoya et al. ............... 451/47 |
| 5,175,962 | A | * | 1/1993 | Pedersen ..................... 451/5 |
| 5,562,372 | A | * | 10/1996 | Baima et al. ................ 409/51 |
| 5,791,840 | A | * | 8/1998 | Sijtstra .................... 409/12 |
| 5,839,943 | A | | 11/1998 | Stadtfeld |
| 5,895,180 | A | | 4/1999 | Stadtfeld |
| 5,941,124 | A | | 8/1999 | Tan |
| 6,712,566 | B2 | | 3/2004 | Stadtfeld et al. |
| 6,951,501 | B2 | | 10/2005 | Tan |
| 7,426,777 | B2 | * | 9/2008 | Nagata et al. ............... 29/33 R |
| 2002/0034926 | A1 | * | 3/2002 | Yasuie et al. ............... 451/47 |
| 2002/0119737 | A1 | * | 8/2002 | Tan ......................... 451/47 |
| 2008/0085166 | A1 | * | 4/2008 | Stadtfeld et al. ............ 409/2 |
| 2010/0041319 | A1 | * | 2/2010 | Pilkington .................. 451/47 |
| 2011/0103911 | A1 | * | 5/2011 | Stadtfeld ................... 409/26 |

FOREIGN PATENT DOCUMENTS

| | | | |
|---|---|---|---|
| GB | 722030 A | * 1/1955 | ......... B23F 5/065 |
| WO | WO 2009/157988 A1 | 12/2009 | |

* cited by examiner

CONTINUOUS METHOD FOR MANUFACTURING FACE GEARS

FIELD OF THE INVENTION

The present invention is directed to the manufacturing of gears and in particular, to a method and tool for manufacturing face gears.

BACKGROUND OF THE INVENTION

Face gears are ring gears with a face angle (and root angle) equal to the shaft angle between the face gear and it's mating member. The mating member is a regular cylindrical spur or helical pinion. Standard face gears have a face angle of 90° which corresponds to a shaft angle of also 90° (such 90° gears are also known as "crown" gears).

To date, methods of manufacturing face gears have been complicated, with special tools dedicated to a single design applied on machine tools which are usually modified cylindrical gear manufacturing machines. Such methods for the soft manufacturing of face gears include:

Hobbing, using a job dedicated special hob on a cylindrical hobbing machine, which is modified in order to allow for cutting at the lowest circumferential section of the hobbing tool (vertical hobbing machine table axis).

Shaping, using a shaper cutter representing the mating cylindrical pinion, and a shaping machine, with a work table which is rotated (versus a regular cylindrical gear shaping machine) by the face gear set's root angle (commonly 90°).

Universal milling method, using an end mill on a 5-axes machining center.

Grinding from solid, using the grinding methods mentioned in the hard finishing section below.

Today's known methods for the hard finishing of face gears include:

Continuous grinding, using a threaded grinding wheel with a thread reference profile, identical to the face gear set's pinion tooth profile on a large diameter wheel with small width having generally 1.5 to 2.5 thread revolutions (see WO 98/02268; U.S. Pat. No. 6,390,894; and U.S. Pat. No. 6,951,501 the disclosures of which are hereby incorporated by reference).

Single index generating grinding with a wheel profile identical to the face gear set's pinion tooth profile.

Skiving, using a shaper cutter or special hob.

Skiving, using and end mill on a 5-axes machining center.

Honing, using a modified pinion with an abrasive layer on the tooth surface.

Presently, face gear soft machining methods depend on job specific, special tools, which are expensive and not flexible regarding their use for other jobs or for optimizations. The machining time of a face gear is in general significantly longer than the cutting time of a comparable cylindrical or bevel ring gear.

Two of the more common face gear hard finishing methods use either a very complex tool geometry which is difficult to dress and requires a long dressing time (threaded wheel grinding), or a complicated and time consuming generating roll, combined with a feed motion in face width direction (single index generating grinding).

Skiving with a special hob or a shaper cutter made from carbide material provides reasonable cutting times but requires a tool which is not only expensive but also not readily available or not available at all.

Face gear honing requires, for example, a heat treated, ground and CBN coated pinion, which is expensive, not flexible and depends on a rather large pinion offset (equal the required offset between face gear and mating cylindrical pinion) for good chip removal, which limits the application to face gear sets which have such a high offset.

SUMMARY OF THE INVENTION

The present invention is directed to a tool, representing a plane which can be oriented to a work piece (e.g. face gear) under an angle equal to the pressure angle of the mating pinion member of the gear set (e.g. the face gear set), and, which can be rotated around a virtual pinion axis to generate a tooth flank on the work piece. The inventive tool is a face cutter which performs a continuous indexing motion, with equal hand of rotation of cutter and work piece (e.g. face gear) thereby describing a hypocycloid path of motion, and an indexing ratio of two cutter rotations during one work gear rotation which will produce straight lines along the face width of the work.

BRIEF DESCRIPTION OF THE DRAWINGS

FIG. 6 also contains an exploded view of the periphery of the grinding wheel.

DETAILED DESCRIPTION OF THE PREFERRED EMBODIMENT

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

Although references may be made below to directions such as upper, lower, upward, downward, rearward, bottom, top, front, rear, etc., in describing the drawings, the references are made relative to the drawings (as normally viewed) for convenience. These directions are not intended to be taken literally or limit the present invention in any orientation or form.

The utilization of face gears for certain applications is highly dependent on the availability of an efficient and economical manufacturing process. To date, no economical soft machining or hard finishing process for face gears is available.

Figure 1:
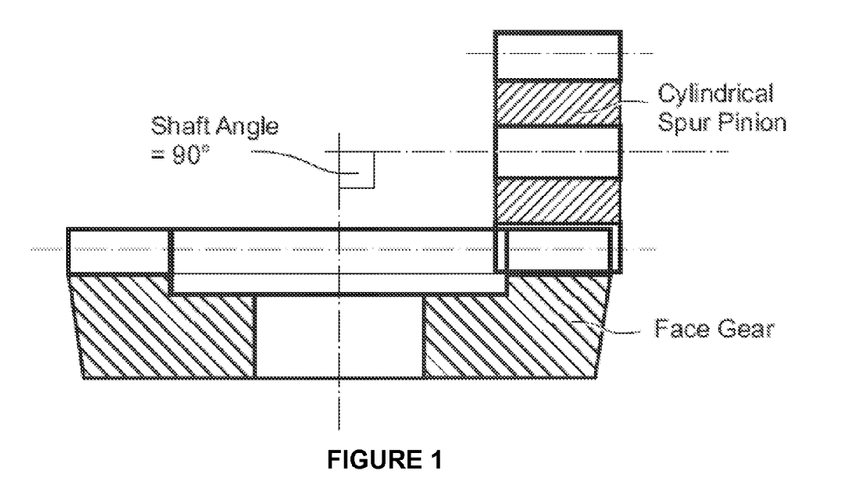
FIG. 1 shows a 2-dimensional, cross sectional view of a face gear and its mating cylindrical spur pinion.

FIG. 1 shows a 2-dimensional, cross sectional view of a face gear and it's mating cylindrical spur pinion. The shaft angle between face gear axis and pinion axis is 90° in this example. Shaft angles larger than 90° will make the face gear an internal ring gear. In the special case of a 0° shaft angle, the face gear pair mutates to a cylindrical ring gear.

Figures 2A, 2B:
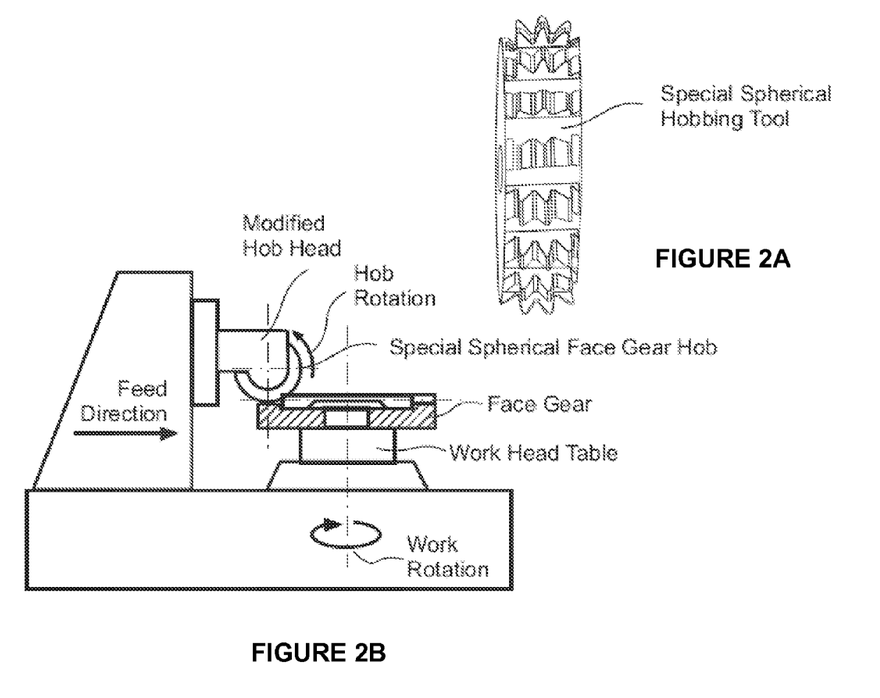
FIGS. 2A and 2B show, respectively, a spherical hobbing tool and a cylindrical hobbing machine.

FIG. 2A shows a spherical hobbing tool. The cutting blades (cutting teeth) of the hob represent the teeth of a spur pinion, as they are grouped around the cylindrical pinion body (in a section consisting of 3 teeth). FIG. 2B also shows a cylindrical hobbing machine with a modified hob head, which allows to cut the teeth of a face gear on the bottom section of the hob. Commonly a single start hob is used which will require a work rotation of one pitch for every revolution of the hob. The hob is fed from the outside of the face gear to the inside. During the tool feeding, a compensation amount of the work rotation, depending on the tool lead angle has to be considered.

Figure 3:
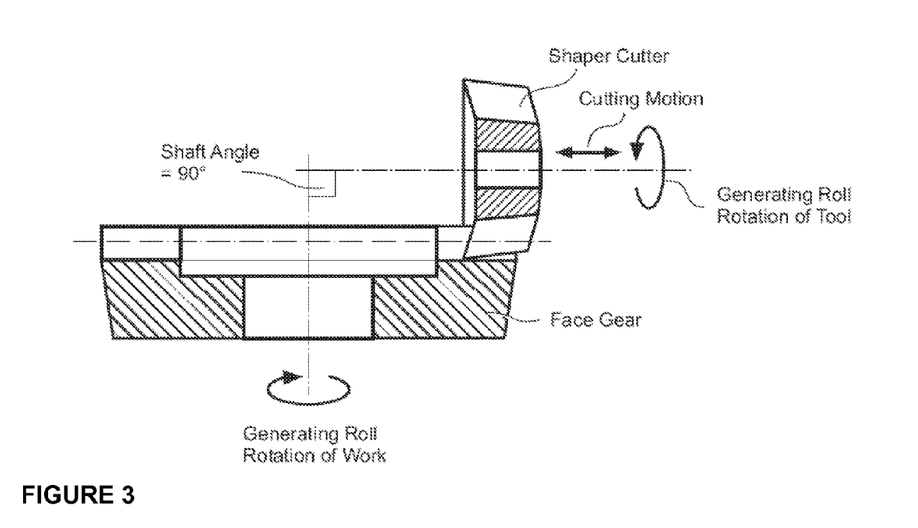
FIG. 3 shows a face gear, where the pinion in FIG. 1 is replaced with a shaper cutter.

FIG. 3 shows a face gear where the pinion in FIG. 1 is replaced by a shaper cutter. The shaper cutter has a number of cutting teeth, equal to the mating pinion (also equal virtual pinion) of the face gear. The cutting contour in a plane, perpendicular to the shaper cutter axis duplicates exactly the virtual pinion's face contour. While the shaper cutter rotates in mesh with the face gear, a stroke motion in axial cutter direction is required for the chip removing action.

Figure 4:
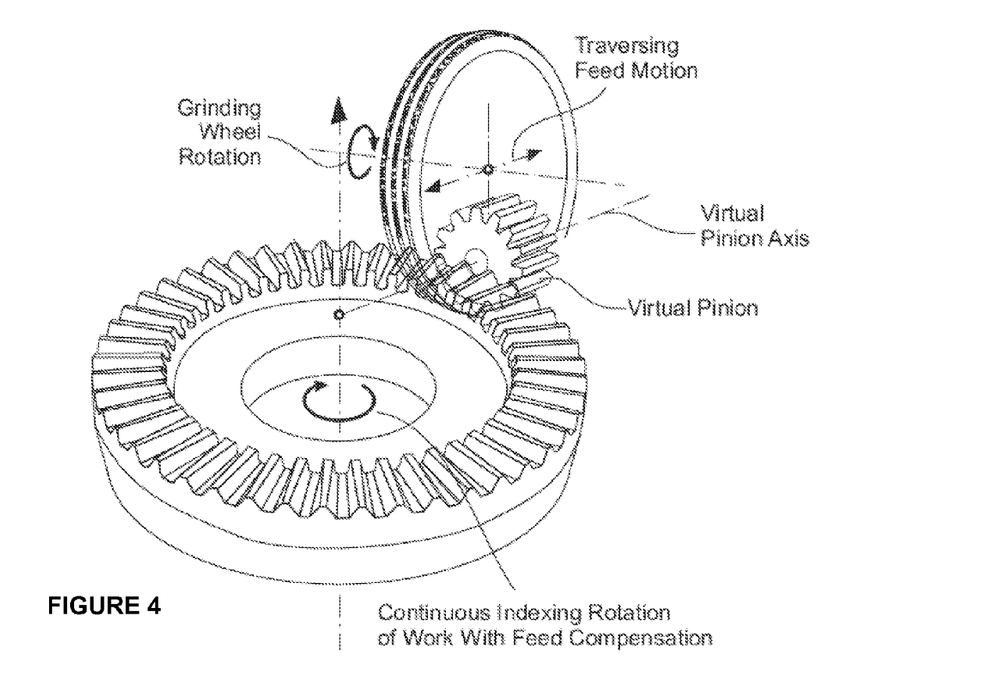
FIG. 4 shows a 3-dimensional view of a threaded grinding wheel which is dressed such that it duplicates in an axial plane cross section the profile of the hobbing tool of FIG. 2A.

FIG. 4 shows a 3-dimensional view of a threaded grinding wheel which is dressed such that it duplicates in an axial plane cross section the profile of the hobbing tool of FIG. 1. While the threaded wheel rotates, the curved orientation of the grinding thread profiles approximate the rotating virtual pinion profile at the location of the plane, defined by the grinding wheel axis and the stroke direction. In order to simulate the entire width of the virtual pinion, the grinding wheel has to traverse in the virtual pinion axis direction along the face width of the face gear. In case of a single thread grinding wheel, the work has to rotate one pitch for every wheel rotation. During the traversing process, the work rotation is superimposed by a lead compensation value.

Figure 5:
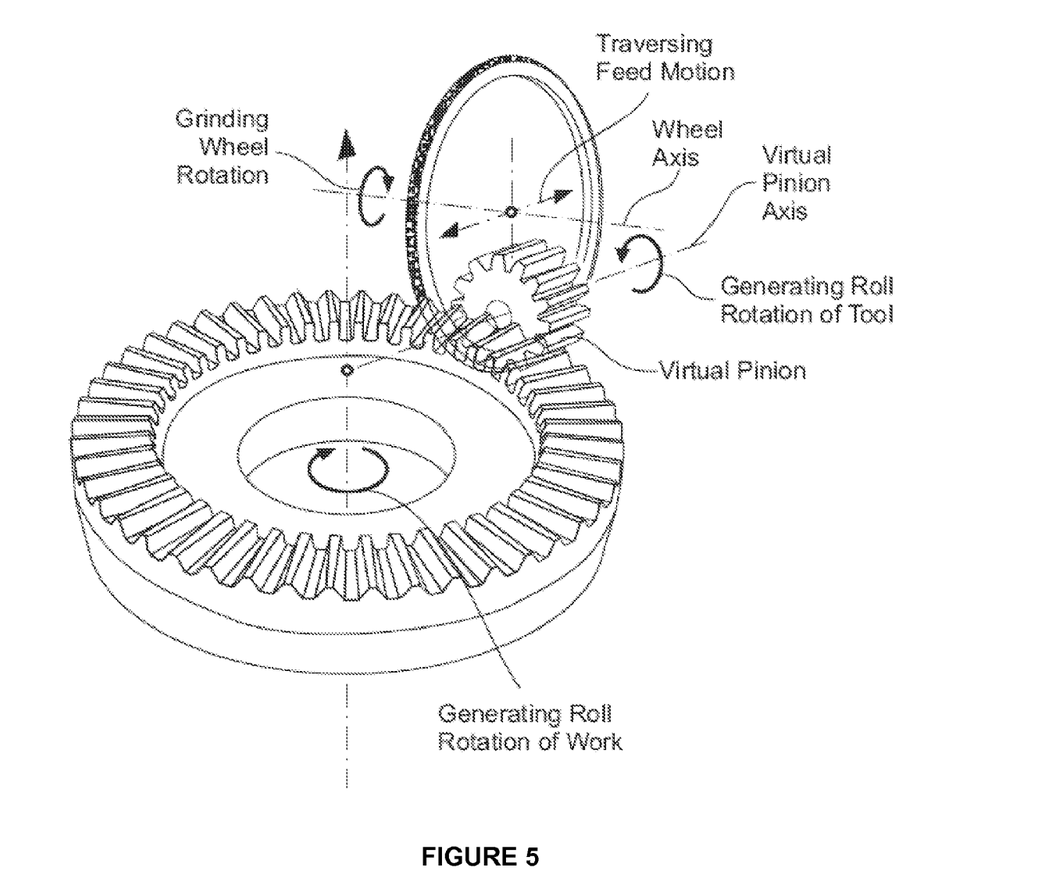
FIG. 5 shows a peripheral disk grinding wheel with a grinding profile that duplicates the face gear mating pinion tooth profile.

FIG. 5 shows a peripheral disk grinding wheel. The grinding profile duplicates the face gear mating pinion tooth profile. This profile forms one point of the face gear profile on each side of the grinding wheel (one roll position and one face width position). If the wheel strokes in direction of the virtual pinion, one contact line (on each side of the generated profile) between virtual pinion and face gear is formed. In order to form the entire face gear tooth profile, the grinding wheel has to rotate around the virtual pinion axis (while it strokes). If the stroke motion was infinitely fast and if the rotation around the virtual pinion axis was infinitely slow, then a mathematically perfect pair of face gear flanks would be generated. The grinding wheel position in FIG. 5 represents a center roll position in the generating roll process.

Figure 6:
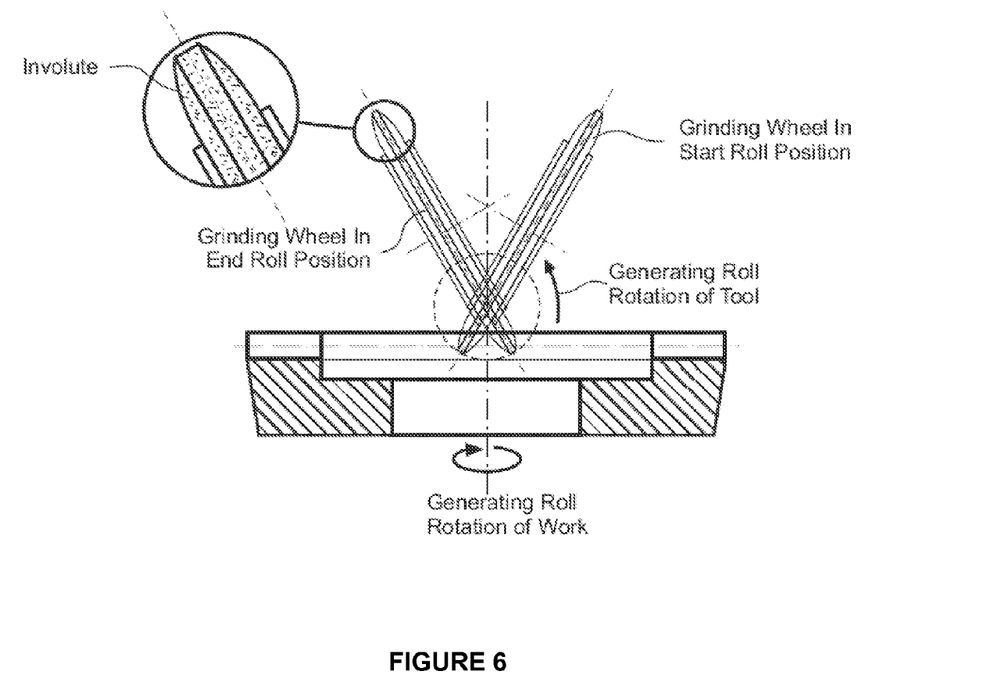
FIG. 6 shows a 2-dimensional cross sectional view of a face gear and grinding wheel (face gear axis lies in cross section plane, cross section plane is perpendicular to virtual pinion axis).

FIG. 6 shows a 2-dimensional cross sectional view of the face gear (face gear axis lies in cross section plane and the cross section plane is perpendicular to virtual pinion axis). The view is also directed at the periphery of the grinding wheel, which is shown not in the center roll position as in FIG. 5 but in the start and end roll position.

As discussed above, the identified prior art soft and hard machining methods for face gears depend on job specific, complex and special tools which are expensive and inflexible regarding their use for other jobs or for optimizations. Additionally, processing and/or dressing times are long and complicated.

The inventor has discovered that a tool disk having cutting blades oriented on its face with the cutting edges of the blades oriented under an angle to the axis of rotation of the cutter disk, represents a plane in the work gear coordinate system in case of a continuous indexing motion if the cutter rotation is twice the value of the work rotation. The hand of rotation of the work piece and the tool have to be identical. The cutter can be oriented to a work piece (face gear) under an angle in order to avoid mutilation in a second, unwanted interference zone.

Figure 7:
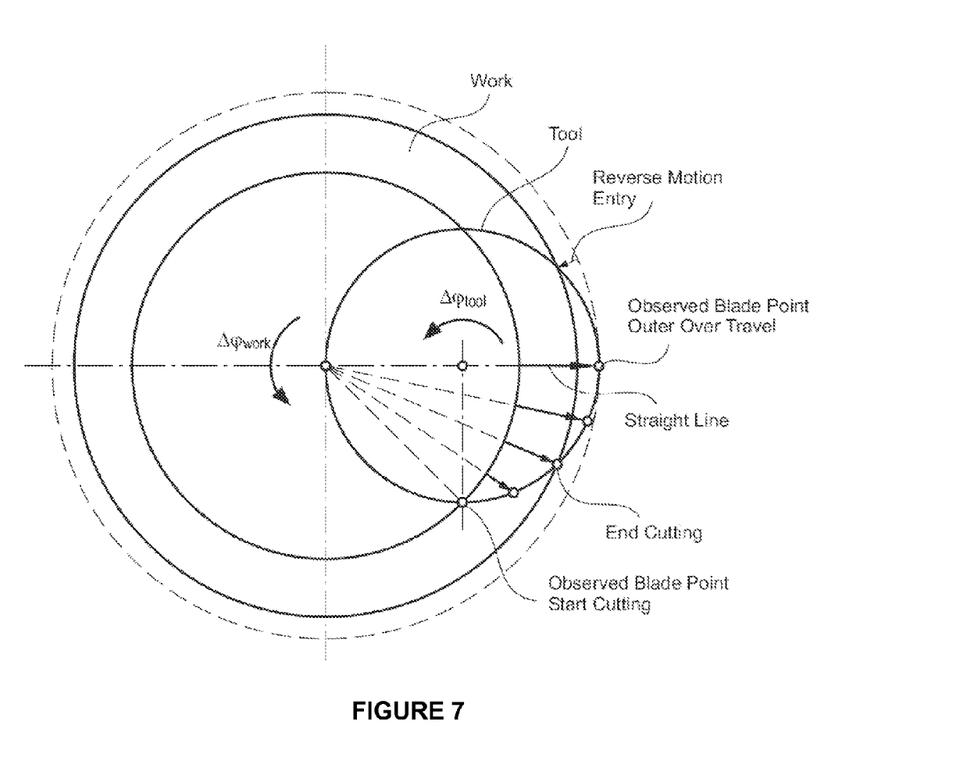
FIG. 7 shows the principle of the hypocyclic motion. At the start cutting position, the observed blade point begins cutting at the inside of the work. While the tool rotates with $\Delta\phi_{Tool}$, the work rotates with $\Delta\phi_{Work}=0.5\Delta\phi_{Tool}$. The relative path between tool and work is shown form the point "Start Cutting" to "End Cutting" and finally "Outer Over Travel" as a straight line.

The described hypocyclical motion will form a flat generating gear with tooth profiles which are identical mirror images of the tool cutting edges. It has been discovered that the cutter which rotates around its axis can be rotated additionally around a virtual pinion axis, which will cause the generation of one or both face gear flank on the work piece. FIG. 7 shows the cutting disk. The disk has cutting edges on its face which are under an angle to the cutter disk axis direction which is equal the mating pinion's pressure angle (projected in a plane which is perpendicular to the relative cutting velocity direction). The tool may have alternating inside and outside blades. The cutting edges of inside and outside blade form one tooth of a generating gear which in the center roll position perfectly represents the pitch line of the virtual pinion. The tool disk has to be rotated into every new roll position around the virtual pinion axis by an angle, calculated from the number of face gear teeth divided by the number of virtual pinion teeth, multiplied by the incremental work gear rotation angle, plus a small additional amount of rotation, which places the disk such that it has a common line with the involute in this particular roll position.

Figure 9:
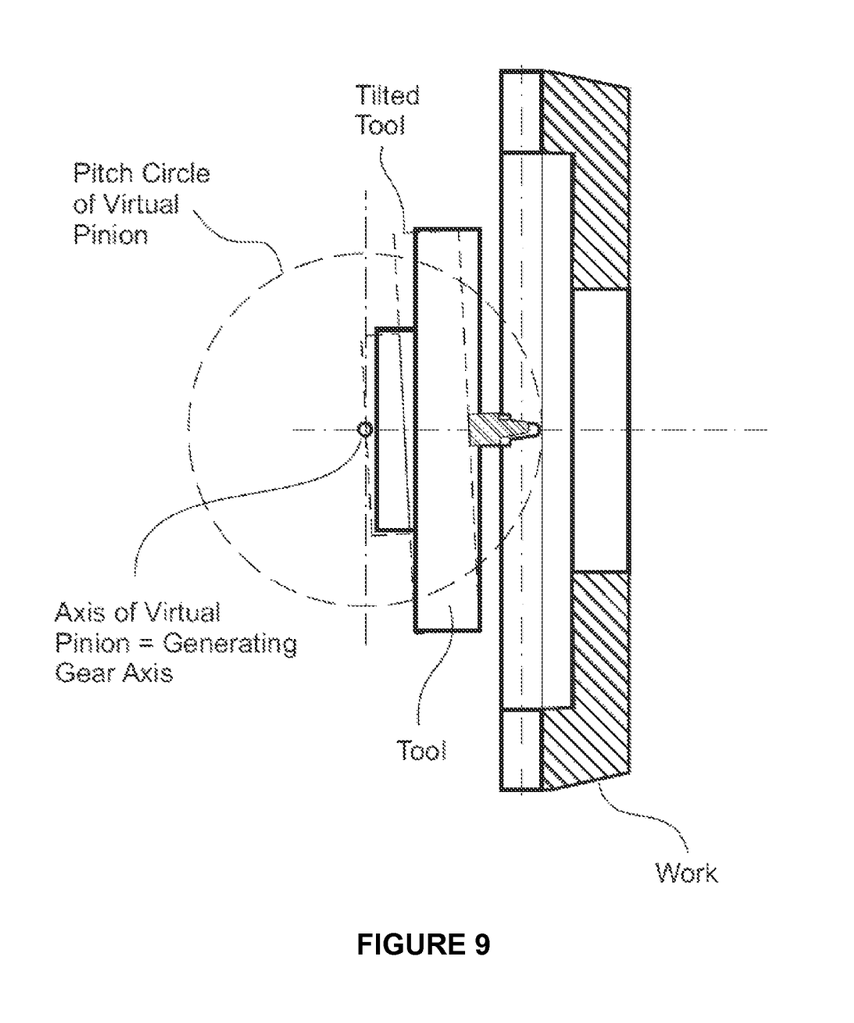
FIG. 9 shows a 2-dimensional cross sectional top view or the arrangement between work, tool and virtual generating pinion. The axis of the virtual pinion is the generating gear axis. While the cutter and the work perform the fast indexing motion (in order to establish straight flank lines using the hypocyclical principle), the tool has to rotate around a second axis, the generating gear axis, which is equal the axis of the virtual pinion. The dashed tool outline shows a tilted tool in order to avoid mutilation or reverse motions of the blade in the slot during the backwards motion.

FIG. 9 shows a 2-dimensional view of the face gear and the tool disk. The tool disk is represented at the center roll position. The discussed virtual cylindrical pinion is only represented with its outline. The center of the virtual pinion is the location of the generating gear axis which is perpendicular to the drawing plane. The dashed tool outline shows the tool tilt arrangement, required in order to avoid mutilation or tool contact during the reverse motion of the cutting blade. The reverse motion entry point is also indicated in FIG. 9. It will be understood by the artisan that the tool tilt angle in space is calculated similar like in spiral bevel and hypoid gears in order to minimize flank form distortions and root line changes in rotating the tool around an axis, e.g. as shown in FIG. 7.

With the inventive process it is preferable that the number of teeth of the face gear is twice the number of cutter starts. It is also possible to use half the number of blades in the cutter (or a quarter, or an eighth, etc.). However the lowest number of cutter starts is one, which results in a low productivity but in a very universal cutter. The number of teeth of the face gear has to be divided by two in order to gain the number of cutter starts which leads to the correct ratio. This means, in turn, the number of face gear teeth is preferably an even number. In the case of an odd number of face gear teeth, one tooth can be added or subtracted in order to be able to divide this new number by two and gain an integer number for the cutter starts. For example, in case of 41 face gear teeth, this means 42/2=21. The number of cutter starts is 21 which cannot be divided by 2 with an integer result. Therefore, the possible number of cutter starts is 21, or one, for each revolution of the cutter. The advantage of rounding is the fact that cutter starts and face gear teeth have no common denominator (hunting tooth principle). The disadvantage of rounding is the fact that the hypocycloid will deviate from a precise straight line. The deviation generates an approximate circular length crowning which is positive on one tooth flank and negative on the other tooth flank. If the negative crowning is found to be not acceptable, the two opposing tooth flanks can be cut in opposite positions on the face gear utilizing the effect of positive length crowing on both flanks, however this will require a dual rotation cycle.

The blades can be ground with an angle equal to the pressure angle of the mating pinion member of the face gear set. Preferably, the blades are oriented on the face of the tool disk with respect to the relative motion direction between tool and work (e.g. based on the center face width since the velocity direction changes constantly along the face). However, this would require the tool axis to be collinear to the work axis in case of a face gear with a face angle of 90°. A collinear axis arrangement may cause mutilation (e.g. during their second crossing of the face width) of tooth slots already cut. Small cutter tilt angles between a fraction of a degree up to 10° (with an equivalent blade angle correction) can be applied to avoid any mutilation. The side effect of a cutter tilt is a tooth flank surface mismatch, which either is acceptable, or can be utilized as an element of desired tooth flank corrections.

The virtual pinion axis can be located in a virtual or theoretical bevel gear generating basic machine, such as is described in U.S. Pat. No. 4,981,402 or U.S. Pat. No. 6,712, 566, the disclosures of which are hereby incorporated by reference, in order to represent a generating cylindrical pinion (generating pinion) where the generating pinion and the work gear resemble the same relationship as the face gear and its mating cylindrical pinion in their final application (for example, a gear box). While the cutter rotates around the virtual pinion axis, the work has to rotate around its axis according to the ratio between pinion and face gear (i.e. Ratio of Roll (Ra)). Namely:

$$Ra = \frac{Z_{Cylindrical\ Pinion}}{Z_{Face\ Gear}} \quad (1)$$

Where: $Z_{Cylindrical\ Pinion}$=number of teeth on pinion; $Z_{Face\ Gear}$=number of teeth on face gear.

Figure 10:
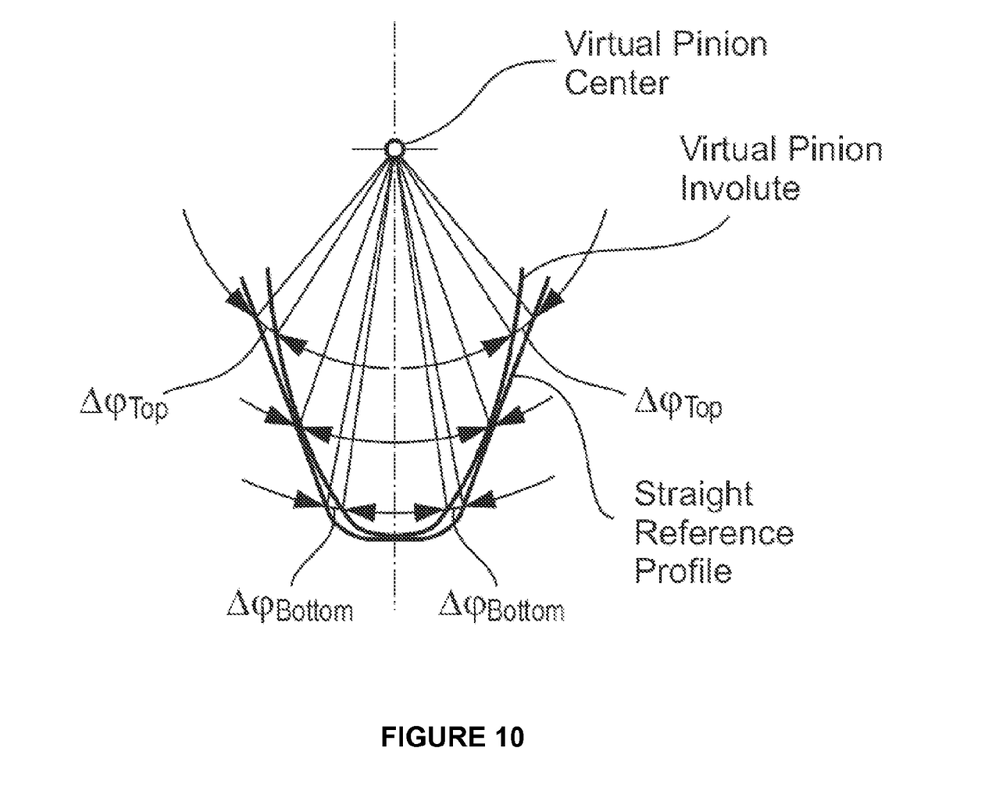
FIG. 10 shows a generating involute versus generating plane. The cutting edge of the blade can be shaped identical to the involute of the original pinion flank which should mate with the face gear flank to be manufactured.

Since the cutter blades represent both flanks of a straight sided rack, as mentioned above, it is not yet duplicating a correct generating involute of the pinion flank (FIG. 10, generating involute versus generating plane). This can be achieved by shaping the cutting edge of the blade identical to the involute of the original pinion flank which should mate with the face gear flank to be manufactured. Another possibility which allows the use of the simplistic and universal straight edged cutting tools is the introduction of a non-constant generating roll relationship (for example, Modified Roll) while generating one flank or utilizing one or more active machine settings such as described in U.S. Pat. No. 5,580,298, the disclosure of which is hereby incorporated by reference. Roll angle related coefficients of 4 orders or higher are multiplied with the constant basic ratio of roll between generating pinion and work gear (face gear) which will accomplish a good approximation of the involute of a virtual generating pinion.

$$Ra = Ra_0 + Ra_1 \cdot q + Ra_2 \cdot q^2 + Ra_3 \cdot q^3 + Ra_4 \cdot q^4 \quad (2)$$

Where:
Ra . . . ratio of roll (not constant)
q . . . roll angle distance from center of roll
$Ra_0$ . . . basic ratio of roll (constant)
$Ra_1$ . . . first order coefficient, multiplied with roll angle distance from center of roll
$Ra_2$ . . . second order coefficient, multiplied with square of roll angle distance from center of roll
$Ra_3$ . . . third order coefficient, multiplied with third power of roll angle distance from center of roll
$Ra_4$ . . . fourth order coefficient, multiplied with fourth power of roll angle distance from center of roll The involute curvature radius can be calculated in a number of points along the generating pinion profile. The second order coefficient $Ra_2$ will basically define the curvature of the involute at the pitch point. The third order coefficient $Ra_3$ will take a constant change of curvature, between root and top into account. The largest part of the non-constant involute curvature change can be accomplished by defining the fourth order coefficient $Ra_4$. A preferred method of calculating optimal coefficient is to use a regression calculation, which, for example, applies the "least squared error method" to minimize the differences between the correct involute and the affect of the coefficients to roll motions, in order to simulate the involute shape by non-linear roll ratio. Higher orders than 4 can be applied to improve the involute accuracy, or the mathematical function of the involute can be applied directly in the machine kinematics. An example of a computation of the correction amount between straight line and involute is shown in FIG. 10.

FIG. 10 shows in a 2-dimensional graphic, a view at the blade, which also shows the position of the virtual pinion axis and three contact positions, representing the bottom, center and top roll position. The correct involute of the virtual pinion is drawn inside of the blade where the involute contacts the generating plane in the contact point (contact line) of the center roll position. The involute function can be calculated with the virtual pinion information such as pressure angle and pitch diameter. The points on the disk's generating surface can be connected with the involute with circles which have their origin in the point which represents the location of the virtual pinion axis. Only at the pitch point (center roll position) will the arc length be zero. The arc in every other position represents the precise value of the small additional amount of rotation (angle Δφ), either to be used to define modified roll coefficients (Equation 2) or to be superimposed on the tool disk rotation around the virtual pinion axis during the generating roll. It is also possible to give the outside profile exactly the shape of the involute instead of a straight line, perpendicular to the tool axis. In this case, no corrective rotation has to be applied.

Figure 8:
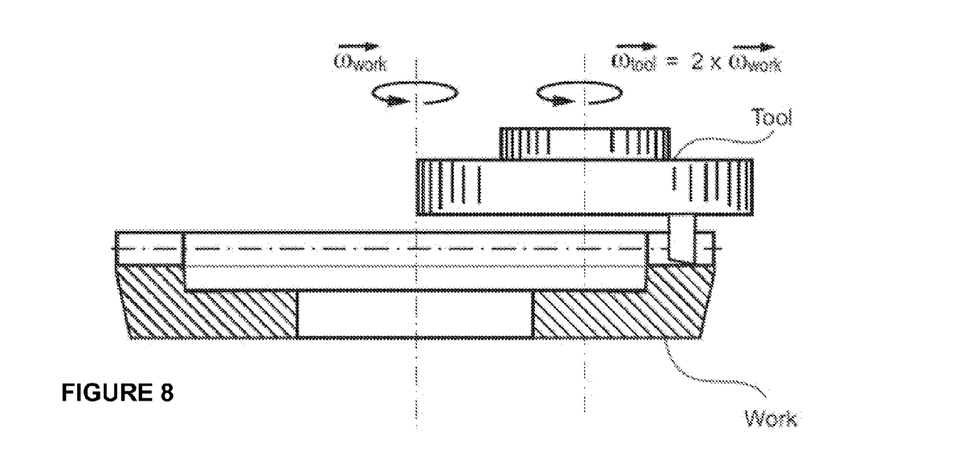
FIG. 8 shows a 2-dimensional cross sectional side view or the arrangement between work, tool and virtual generating pinion.

The inventive set up and kinematic relationships can be based on a virtual bevel gear generating basic machine as described above or on other models or procedures, which are applicable as well. The relationships in FIGS. 8 and 9 correlate with its coordinate system and relative locations of tool, work and generating gear axis as well as the mentioned indexing ratio between work and tool directly to a cradle style bevel gear generator.

Figure 11:
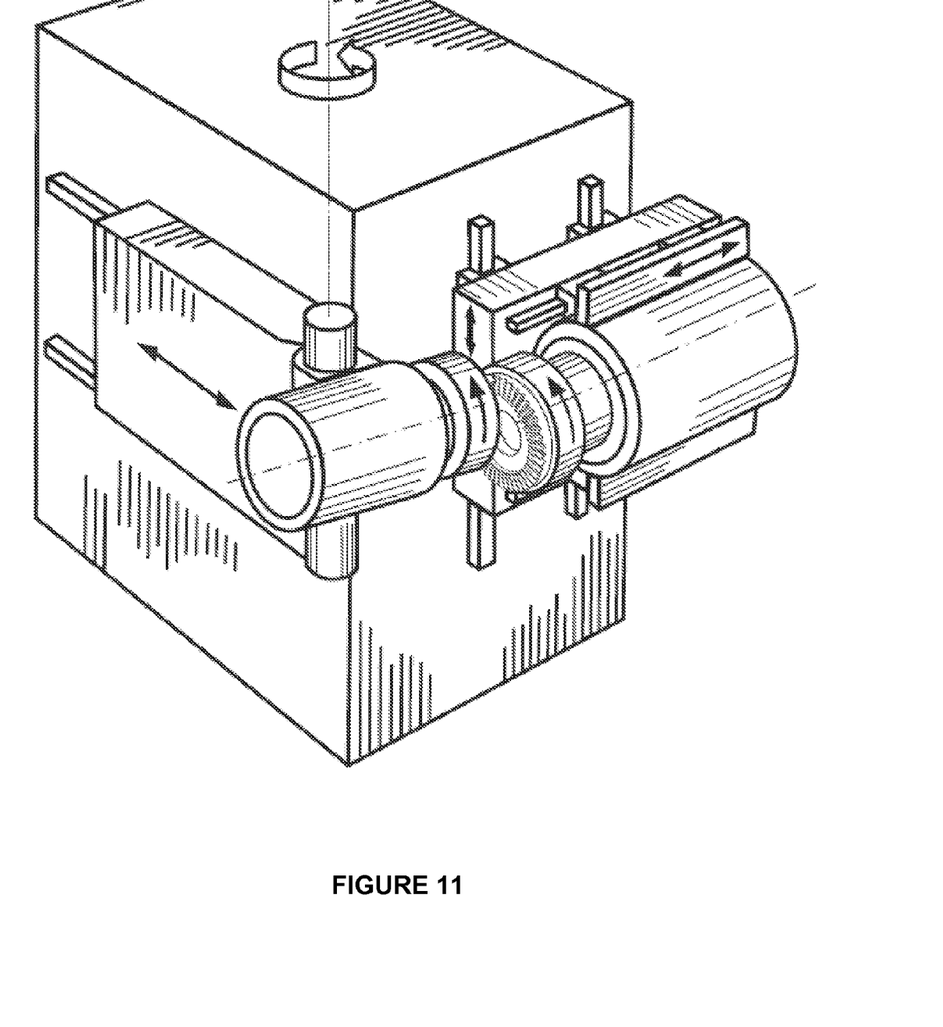
FIG. 11 shows the arrangement between cutter disk and face gear in a 6-axis free form machine.

From the virtual basic machine it is possible to transform the face gear cutting process into suitable mechanical machines settings. It is also possible as a preferred embodiment of the inventive process to transform the virtual basic machine (or any other model) into a table of axis positions and/or motions of a free form 5 or 6-axes machine such as shown in FIG. 11 (for example, U.S. Pat. No. 4,981,402 or U.S. Pat. No. 6,712,566). FIG. 11 shows the arrangement between cutter disk and face gear in a 6-axis free form machine. The diagrams in FIGS. 8 and 9, plus the generating roll ratio represent all information in order to calculate an axes position table. The artisan will understand that small additional amounts of rotation Δφ have to be superimposed to the tool rotation in order to produce correct flank forms.

Another aspect of the inventive method is that the cutter disk only forms a rotational symmetric surface on its axial face. This allows the approximation of involutes of spur pinion flanks. The flanks of helical gears wind around the pinion base cylinder like a spiral. The spiral shape cannot be approximated using a rotating cutting disk with blades that follow a straight line relative to the work gear, which limits the inventive method to face gears that use a spur pinion as a mating member. Helical gears with a very small helix angle (e.g. below 5°) will only show minor flank and root deviations, which can be at least partially corrected.

Shaft angles between face gear and mating pinion between 0° (face gear mutates into a cylindrical gear) and above 90° (face gear becomes an internal ring gear) are possible with the inventive method. Internal face gears are limited by possible mutilation which can be avoided by cutter tilt within certain limits (tilt angle maximally 10°). This kind of tool tilt is shown in FIG. 9 as dashed tool outline. Also shaft offset between face gear and mating pinion can be realized with the inventive method.

Figure 12:
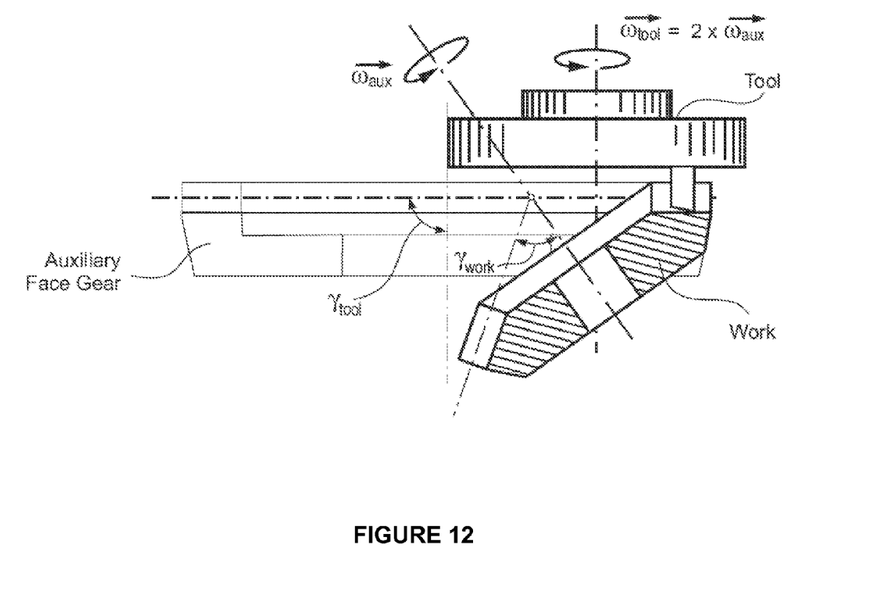
FIG. 12 shows a work gear with a pitch angle below 90° positioned in relation to a virtual auxiliary face gear with a pitch angle of 90°.

Additionally, gears with a pitch angle of not equal to 90°, but between 90° and 0° are often referred to as face gears although they are conical. The reason is that like true face gears, they are meshing with a cylindrical gear as mating member. The manufacture of the non 90° pitch angle face gears can also be done applying the inventive method. FIG. 12 shows a work gear with a pitch angle below 90°. The gear is positioned in relation to a virtual auxiliary gear (with pitch angle 90°). FIG. 12 shows that the work gear is positioned such that its pitch cone is tangent to the auxiliary gear's pitch plane. The work gear and the auxiliary gear roll without slippage with their pitch elements onto each other. That principle leads to the relationship of the angular velocities of cutter and work. Namely:

$$\frac{\omega_{work}}{\omega_{Aux}} = \frac{\sin\gamma_{Aux}}{\sin\gamma_{work}} \rightarrow \omega_{Aux} = \omega_{Work}\frac{\sin\gamma_{work}}{\sin\gamma_{Aux}} \quad (3)$$

If $\omega_{tool} = 2\omega_{Aux}$ and $\gamma_{Aux} = 90°$ then $\omega_{tool} = 2\omega_{work} \sin\gamma_{work}$ \quad (4)

Where:
$\omega_{work}$=angular velocity of work gear;
$\omega_{Aux}$=angular velocity of auxiliary face gear;
$\omega_{tool}$=angular velocity of tool;
$\gamma_{work}$=pitch angle of work gear;
$\gamma_{Aux}$=pitch angle of auxiliary face gear.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A continuous indexing method of manufacturing a face gear having a predetermined number of teeth, said face gear having a plurality of tooth slots with each tooth slot comprising opposing first and second tooth flank surfaces, said method comprising:
   providing a face gear workpiece having an axis of rotation;
   providing a cutting tool having an axis of rotation and comprising a disk body with one or more cutting edges defining one or more cutting blade starts located on a face of said disk;
   rotating said cutting tool and said workpiece at a ratio of two rotations of said cutting tool per one rotation of said workpiece;
   engaging said cutting tool and said workpiece;
   generating said tooth surfaces on said workpiece by moving the tool and workpiece relative to each other;
   wherein said generating comprises additionally rotating said cutting tool about an axis of rotation of a virtual pinion in mesh with said face gear workpiece, said cutting tool describing a generating roll wherein the cutting edges emulate the rolling motion of a tooth of said virtual pinion rotating in mesh with said face gear workpiece during said generating.

2. The method of claim 1 wherein said workpiece comprises an even number of teeth with said number of teeth being twice the number of said starts of the cutting tool.

3. The method of claim 1 wherein said workpiece and said cutting tool rotate in the same direction about their respective axes of rotation.

4. The method of claim 1 wherein said cutting tool is tilted with respect to said workpiece.

5. The method of claim 1 wherein said cutting edges comprise inside and outside cutting edges.

6. The method of claim 1 wherein said first and second tooth flank surfaces are straight in the direction of the face width of said workpiece.

7. The method of claim 1 wherein the tooth surfaces of the workpiece are oriented at a pressure angle and the cutting edges of the tool are oriented at a pressure angle equal to the pressure angle of said workpiece.

8. The method of claim 1 where the cutting edges are involute shaped.

9. The method of claim 1 wherein the generating roll is a non-constant generating rolling relationship.

10. The method of claim 1 wherein said face gear comprises a pitch angle of 90 degrees.

11. The method of claim 1 wherein said face gear comprises a pitch angle of less than 90 degrees.

12. The method of claim 1 wherein said face gear comprises an internal face gear.

\* \* \* \* \*